US012764743B2

(12) United States Patent
Löhr et al.

(10) Patent No.: US 12,764,743 B2
(45) Date of Patent: Oct. 13, 2026

(54) INDICATORS FOR PHYSICAL DOWNLINK SHARED CHANNEL TRANSMISSIONS

(71) Applicant: Lenovo (Beijing) Limited, Beijing (CN)

(72) Inventors: Joachim Löhr, Wiesbaden (DE); Haipeng Lei, Beijing (CN); Congchi Zhang, Shanghai (CN); Mingzeng Dai, Shanghai (CN); Hyung-Nam Choi, Ottobrunn (DE); Prateek Basu Mallick, Dreieich (DE)

(73) Assignee: Lenovo (Beijing) Limited, Beijing (CN)

( * ) Notice: Subject to any disclaimer, the term of this patent is extended or adjusted under 35 U.S.C. 154(b) by 335 days.

(21) Appl. No.: 18/579,013

(22) PCT Filed: Jul. 14, 2021

(86) PCT No.: PCT/CN2021/106252
§ 371 (c)(1),
(2) Date: Jan. 12, 2024

(87) PCT Pub. No.: WO2023/283825
PCT Pub. Date: Jan. 19, 2023

(65) Prior Publication Data
US 2024/0334433 A1 Oct. 3, 2024

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .............. H04W 72/1273; H04W 72/23; H04L 1/1822; H04L 1/1845; H04L 1/1864; H04L 2001/0093
See application file for complete search history.

(56) References Cited

U.S. PATENT DOCUMENTS

2017/0006437 A1 1/2017 Guo et al.
2022/0286818 A1* 9/2022 Chin ....................... H04W 4/06
(Continued)

FOREIGN PATENT DOCUMENTS

CN 101883325 A 11/2010
EP 2209248 B1 * 9/2011 ............ H04W 36/02
(Continued)

OTHER PUBLICATIONS

Internation Searching Authority, "International Search Report and Written Opinion of the International Searching Authority," PCT/CN2021/106252, Feb. 28, 2022, pp. 1-6.
(Continued)

*Primary Examiner* — Chae S Lee
(74) *Attorney, Agent, or Firm* — Kunzler Needham Hilton

(57) ABSTRACT

Apparatuses, methods, and systems are disclosed for indicators for physical downlink shared channel transmissions. One method includes receiving, at a user equipment, a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

20 Claims, 13 Drawing Sheets

(56) References Cited

U.S. PATENT DOCUMENTS

| | | | | |
|---|---|---|---|---|
| 2022/0322293 | A1* | 10/2022 | Baek | H04W 72/30 |
| 2024/0421960 | A1* | 12/2024 | Zhou | H04L 5/0094 |

FOREIGN PATENT DOCUMENTS

| | | | | |
|---|---|---|---|---|
| KR | 10-2021-0041431 | * | 3/2021 | |
| WO | WO-2022170312 A1 | * | 8/2022 | H04W 72/53 |

OTHER PUBLICATIONS

Lenovo et al., "5G MBS dynamic switch between PTP and PTM with service continuity", 3GPP TSG-RAN WG2 Meeting #112e R2-2009880, Nov. 2-13, 2020, pp. 1-3.

Lenovo et al., "MBS dynamic switch between PTP and PTM with service continuity", 3GPP TSG-RAN WG2 Meeting #113e R2-2101143, Jan. 25-Feb. 5, 2021, pp. 1-3.

3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.

3GPP, "3rd Generation Partnership Project; Technical Specification Group Radio Access Network; NR; Physical layer procedures for control (Release 16)", 3GPP TS 38.213 V16.5.0, Mar. 2021, pp. 1-183.

3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.

3GPP, "3rd Generation Partnership Project; Technical Specification Group Radio Access Network; NR; Medium Access Control (MAC) protocol specification (Release 16)", 3GPP TS 38.321 V16.4.0, Mar. 2021, pp. 1-157.

3GPP, "3rd Generation Partnership Project; Technical Specification Group Radio Access Network; NG-RAN; F1 application protocol (F1AP) (Release 16)", 3GPP TS 38.473 V16.4.0, Jan. 2021, pp. 1-461.

* cited by examiner

700

702

| | TB1 (PTM initial) | TB1 (PTP ReTx) | TB2 (PTM initial) missed | TB2 (PTP ReTx) |
|---|---|---|---|---|
| UE1 | NDI=10 | NDI=10 | NDI=00 | NDI=00 |
| UE2 | NDI=10 | NDI=10 | NDI=00 | NDI=00 |

704

| | | TB1 (PTP initial) | TB2 (PTM initial) missed | TB2 (PTP ReTx) |
|---|---|---|---|---|
| UE1 | | NDI=11 | NDI=00 | NDI=00 |
| UE2 | | NDI=10 | NDI=00 | NDI=00 |

706

| | TB1 (PTP initial) | TB1 (PTP ReTx) | TB2 (PTM initial) missed | TB2 (PTP ReTx) |
|---|---|---|---|---|
| UE1 | NDI=11 | NDI=11 | NDI=01 | NDI=01 |
| UE2 | NDI=10 | NDI=10 | NDI=01 | NDI=01 |

FIG. 7

800

802

| | | TB1 (PTP initial) | TB2 (PTM initial) missed | TB2 (PTP ReTx) |
|---|---|---|---|---|
| UE1 | | NDI=1; P=0 | NDI=0; P=0 | NDI=0; P=1 |
| UE2 | | NDI=0; P=0 | NDI=0; P=0 | NDI=0; P=1 |

804

| | TB1 (PTM initial) | TB1 (PTP ReTx) | TB2 (PTM initial) missed | TB2 (PTP ReTx) |
|---|---|---|---|---|
| UE1 | NDI=0; P=0 | NDI=0; P=1 | NDI=1; P=0 | NDI=1; P=1 |
| UE2 | NDI=0; P=0 | NDI=0; P=1 | NDI=1; P=0 | NDI=1; P=1 |

FIG. 8

900

902

| | TB1 (PTM initial) | TB1 (PTM ReTx) | TB2 (PTM initial) missed | TB2 (PTP ReTx) |
|---|---|---|---|---|
| UE1 | NDI=1; P=0 | NDI=1; P=1 | NDI=0; P=0 | NDI=0; P=1 |
| UE2 | NDI=1; P=0 | NDI=1; P=1 | NDI=0; P=0 | NDI=0; P=1 |

904

| | TB1 (PTM initial) | TB2 (PTM Initial) | TB3 (PTM initial) missed | TB3 (PTP ReTx) |
|---|---|---|---|---|
| UE1 | NDI=1; P=0 | NDI=0; P=1 | NDI=1; P=1 | NDI=1; P=1 |
| UE2 | NDI=1; P=0 | NDI=0; P=1 | NDI=1; P=1 | NDI=1; P=1 |

FIG. 9

1000

| | TB1 (PTM initial) | TB2 (PTM initial) | TB2 (PTM ReTx) missed | TB2 (PTP ReTx) |
|---|---|---|---|---|
| UE1 | NDI=1; P=0 | NDI=0; P=1 | NDI=0; P=1 | NDI=0; P=0 |
| UE2 | NDI=1; P=0 | NDI=0; P=1 | NDI=0; P=1 | NDI=0; P=0 |

FIG. 10

1100

| | | TB1 (PTP initial) | TB2 (PTM initial) missed | TB2 (PTP ReTx) |
|---|---|---|---|---|
| UE1 | | NDI=1; I=0 | NDI=0; I=1 | NDI=0; I=1 |
| UE2 | | NDI=0; I=0 | NDI=0; I=1 | NDI=0; I=1 |

FIG. 11

INDICATORS FOR PHYSICAL DOWNLINK SHARED CHANNEL TRANSMISSIONS

FIELD

The subject matter disclosed herein relates generally to wireless communications and more particularly relates to indicators for physical downlink shared channel transmissions.

BACKGROUND

In certain wireless communications networks, data may be missed and/or incorrectly combined with other data due to missed transmissions. A user device may not know that it has missed data and/or incorrectly combined data.

BRIEF SUMMARY

Methods for indicators for physical downlink shared channel transmissions are disclosed. Apparatuses and systems also perform the functions of the methods. One embodiment of a method includes receiving, at a user equipment, a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

One apparatus for indicators for physical downlink shared channel transmissions includes a user equipment. In some embodiments, the apparatus includes a receiver that receives a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

Another embodiment of a method for indicators for physical downlink shared channel transmissions includes transmitting a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

Another apparatus for indicators for physical downlink shared channel transmissions includes a transmitter that transmits a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 illustrates one embodiment of examples of a two bit NDI;

FIG. 8 illustrates one embodiment of examples using a P-bit;

FIG. 9 illustrates another embodiment of examples using a P-bit;

FIG. 10 illustrates a further embodiment of one example using a P-bit;

FIG. 11 illustrates one embodiment of an example using an I-bit;

DETAILED DESCRIPTION

Figure 1:
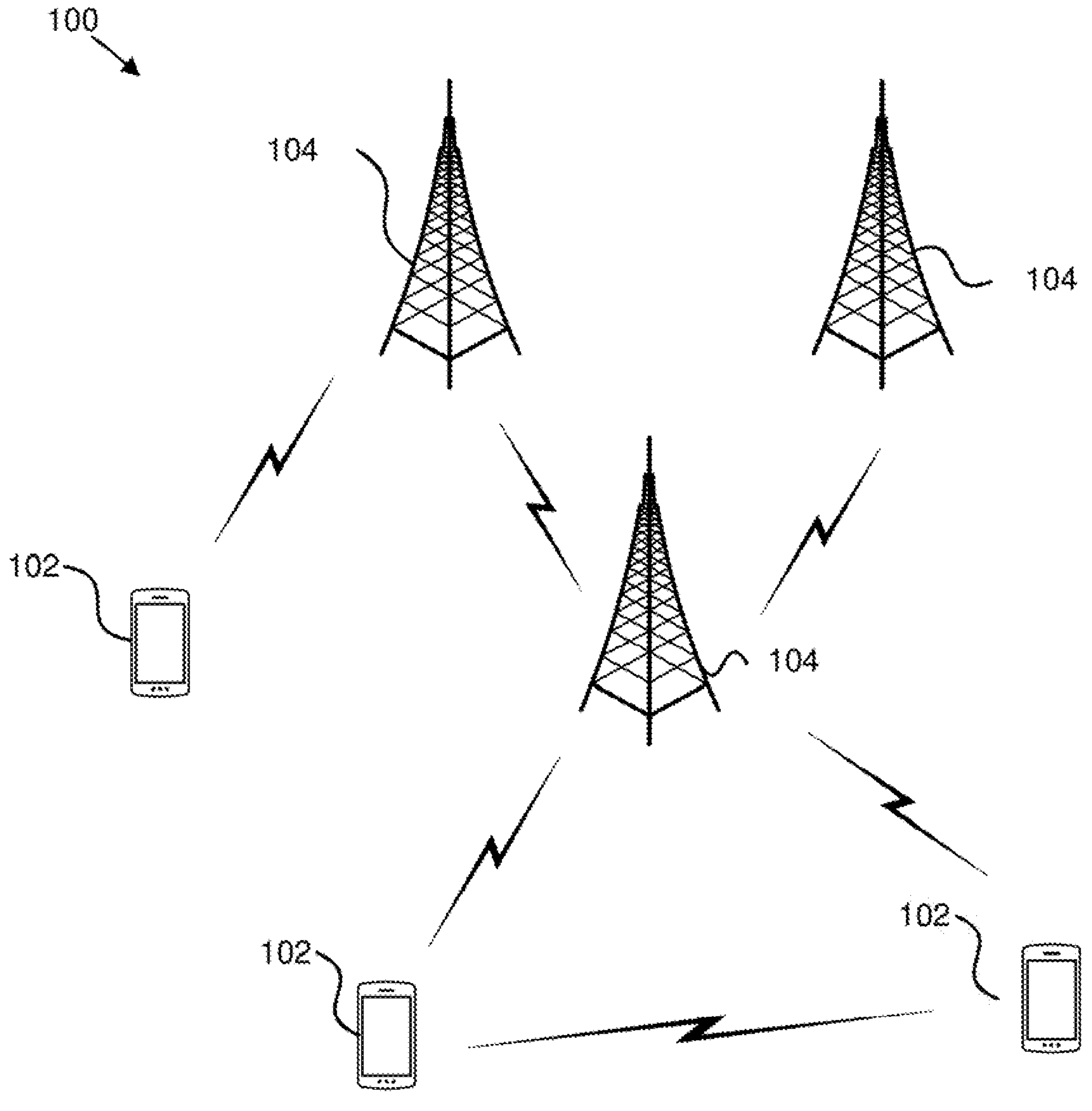
FIG. 1 is a schematic block diagram illustrating one embodiment of a wireless communication system for indicators for physical downlink shared channel transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for indicators for physical downlink shared channel transmissions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode. Accordingly, the remote unit 102 may be used for indicators for physical downlink shared channel transmissions.

In certain embodiments, a network unit 104 may transmit a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode. Accordingly, the network unit 104 may be used for indicators for physical downlink shared channel transmissions.

Figure 2:
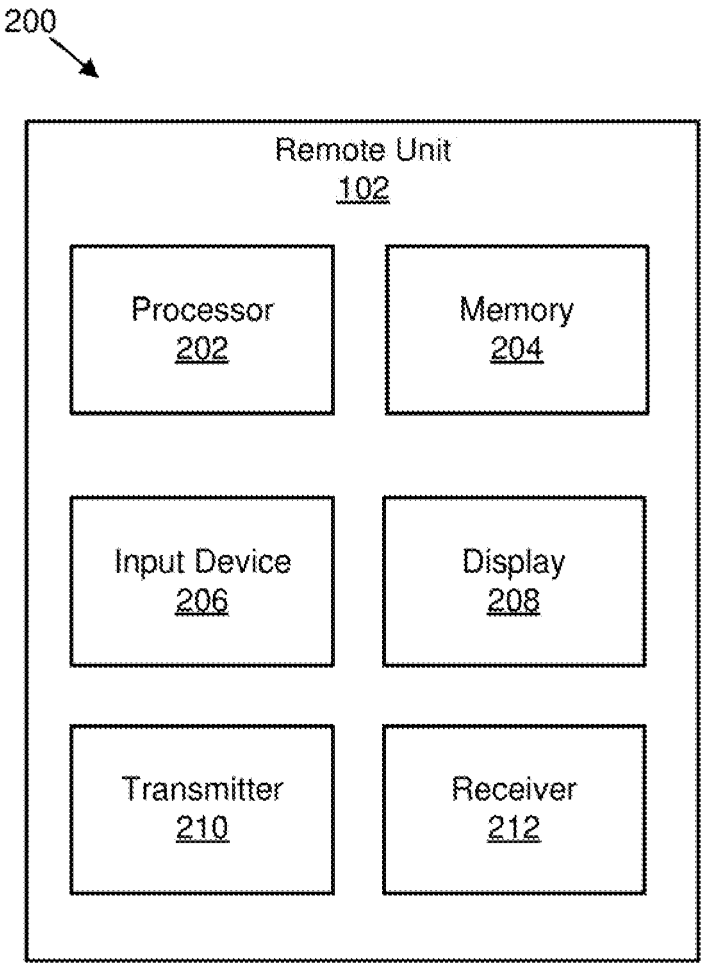
FIG. 2 is a schematic block diagram illustrating one embodiment of an apparatus that may be used for indicators for physical downlink shared channel transmissions.

FIG. 2 depicts one embodiment of an apparatus 200 that may be used for indicators for physical downlink shared channel transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212 receives a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
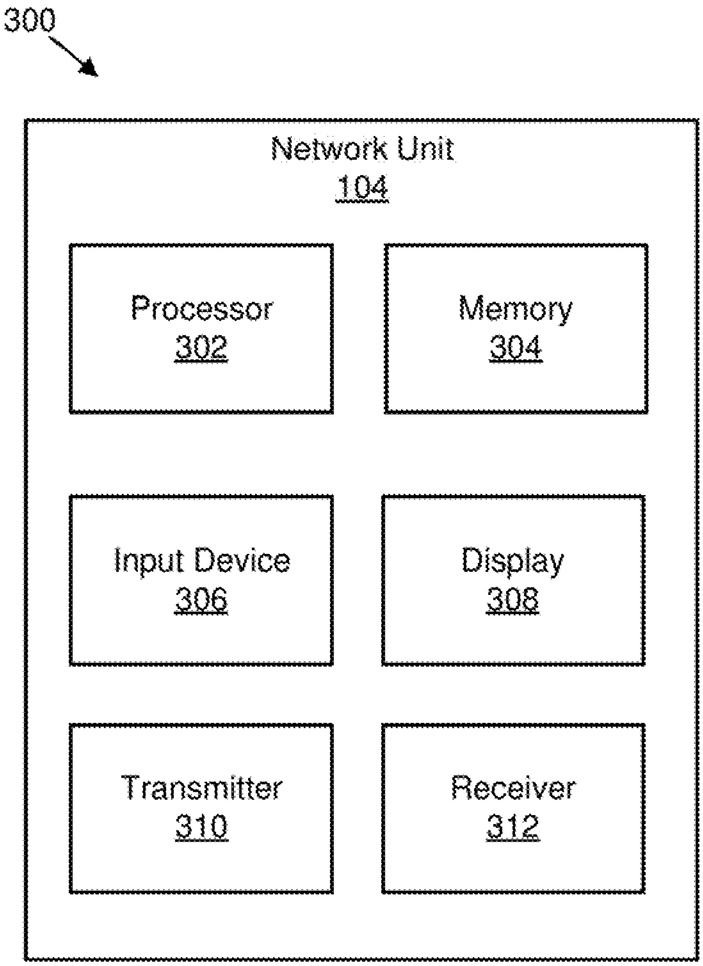
FIG. 3 is a schematic block diagram illustrating one embodiment of an apparatus that may be used for indicators for physical downlink shared channel transmissions.

FIG. 3 depicts one embodiment of an apparatus 300 that may be used for indicators for physical downlink shared channel transmissions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

In certain embodiments, multicast and broadcast services ("MBS") may be used in new radio ("NR") with a fifth generation ("5G") core network ("5GC"). Some MBS services only target UEs within a certain area (e.g., local MBS services). In some embodiments, the following may be applied to support local MBS services: 1) an MBS session may be supported where the content is not location-dependent, but the distribution is limited to a certain area, and MBS sessions where the content is location-dependent; 2) MBS core network ("CN") functions may be located in proximity to next generation ("NG") radio access network ("RAN") nodes serving a location area; 3) if a multicast service is only available within a limited area, a user equipment ("UE") may be able to obtain service area information of the multicast service to enable the UE to trigger the session join procedure only within the location area—the UE may be able to obtain service area information of the local multicast service via non-access stratum ("NAS") signaling or via an MBS service announcement; 4) if the MBS service content is location-dependent (e.g., the content of the same MBS service delivered to different sub-areas is different), the UE may not be aware of each sub-area in an available area information of the MBS service; 5) an internal public land mobile network ("PLMN") topology may be hidden from an application function ("AF") (e.g., the AF is not aware of a cell or tracking area ("TA") information); 6) the network may be able to enforce the area restriction for accessing a local MBS service; and/or 7) if different location-dependent content is provided for an MBS session, the network may be able to support multiple ingress points for the MBS session.

In some embodiments, MBS traffic may be delivered from a single data source (e.g., application service provider) to multiple UEs. Depending on many factors, multiple delivery methods may be used to deliver MBS traffic in the 5G system ("5GS"). It should be noted that delivery methods may not be referred to as unicast, multicast, and/or broadcast but may be described as found herein. Moreover, the term unicast delivery may refer to a mechanism by which application data and signaling between the UE and the application server are delivered using a protocol data unit ("PDU") session within a third generation partnership program ("3GPP") network and using individual UE and application server addresses (e.g., internet protocol ("IP") addresses) between the 3GPP network and the application server. It may not be equivalent to a 5GC individual MBS traffic delivery method.

In various embodiments, from the view point of 5G CN, two delivery methods may possible for an MBS multicast service: 1) a 5GC individual MBS traffic delivery method: 5G CN receives a single copy of MBS data packets and delivers separate copies of those MBS data packets to individual UEs via per-UE PDU sessions, hence for each UE one PDU session is required to be associated with a multicast session; and 2) a 5GC shared MBS traffic delivery method: 5G CN receives a single copy of MBS data packets and delivers a single copy of those MBS packets to a RAN node, which then delivers them to one or more UEs.

In certain embodiments, if a 5GC individual MBS traffic delivery method is supported, a same received single copy of MBS data packets by the CN may be delivered via both 5GC individual MBS traffic delivery method for some UEs and 5GC shared MBS traffic delivery method for other UEs.

In some embodiments, from the viewpoint of a RAN, (e.g., for shared delivery) two delivery methods may be available for the transmission of MBS packet flows over radio: 1) point-to-point ("PTP") delivery method: a RAN node delivers separate copies of an MBS data packet over radio to an individual UE; and 2) point-to-multipoint ("PTM") delivery method: a RAN node delivers a single copy of MBS data packets over radio to a set of UEs.

In various embodiments, a RAN node may use a combination of PTP and PTM to deliver an MBS packet to UEs.

Figure 4:
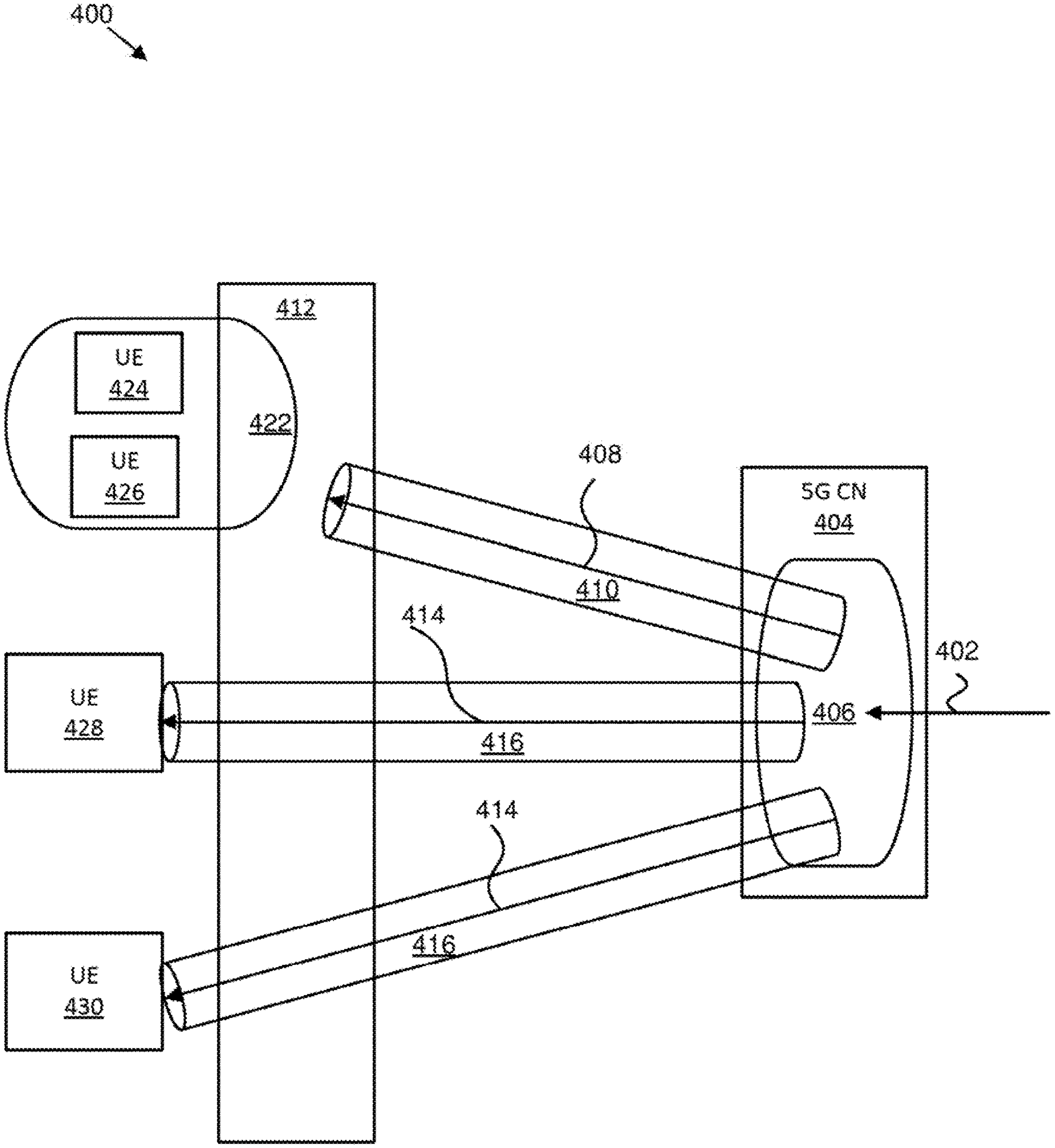
FIG. 4 is a schematic block diagram illustrating one embodiment of a system having various delivery methods.

As illustrated in FIG. 4, PTP or PTM delivery (e.g., with a 5GC shared delivery method) and a 5GC individual delivery method may be used at the same time for a multicast MBS session.

FIG. 4 is a schematic block diagram illustrating one embodiment of a system 400 having various delivery methods. The system 400 receives MBS traffic 402 at a 5G CN 404. The 5G CN 404 performs replication 406 which may result in shared MBS traffic delivery 408 over a shared transport to a 5G RAN 412 and individual MBS traffic delivery 414 over PDU sessions 416 to the 5G RAN 412. The shared MBS traffic delivery 408 may be over PTM or PTP over radio 422 for UEs 424 and 426 and the individual MBS traffic delivery 414 may be for UEs 428 and 430.

In certain embodiments, for an MBS broadcast service, only a 5GC shared MBS traffic delivery method with PTM delivery may be applicable.

Figure 5:
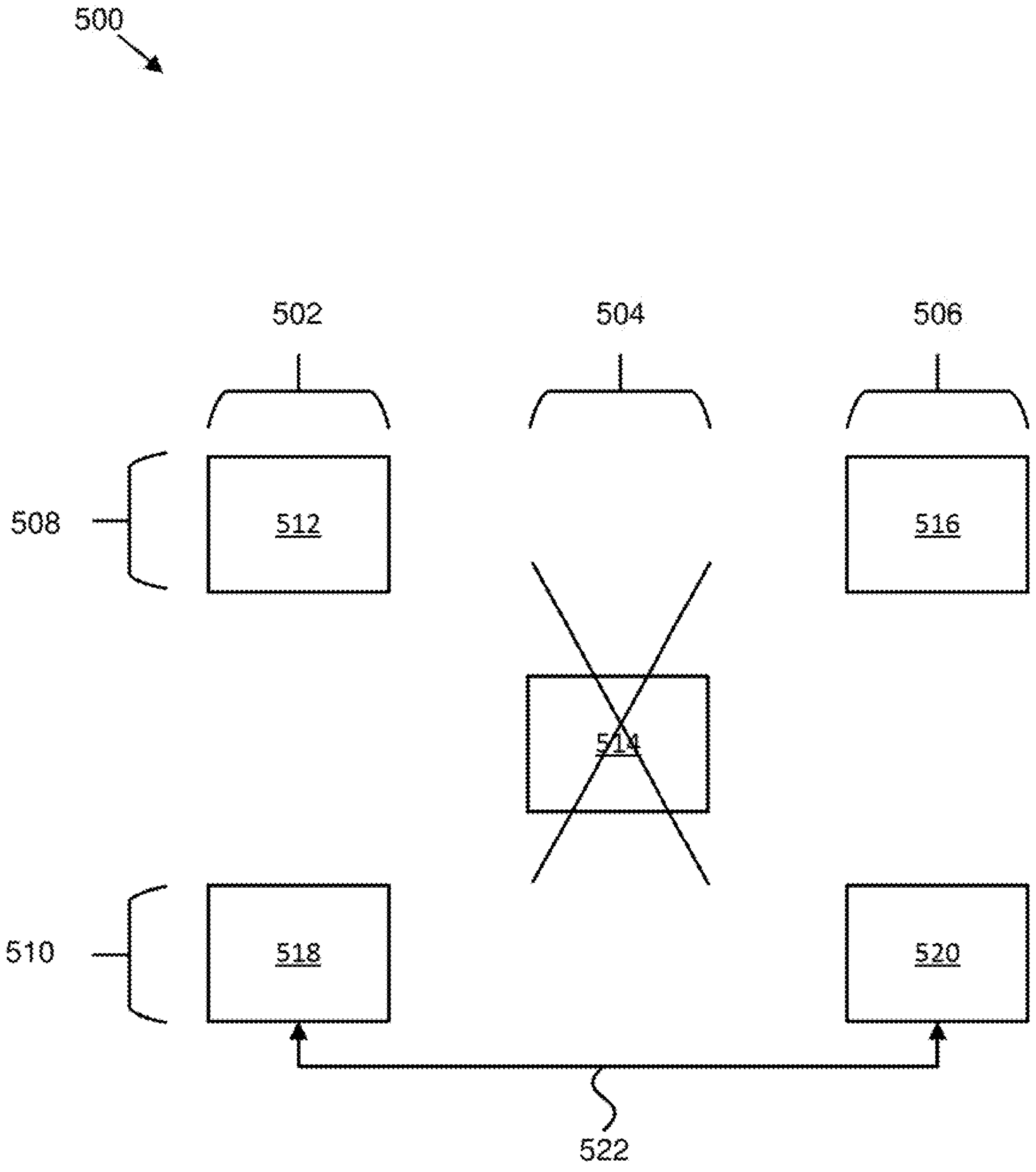
FIG. 5 is a timing diagram illustrating one embodiment of a system having an erroneous soft combining for MBS.

In some embodiments, there may be erroneous soft combining ("SC") as shown in FIG. 5. Specifically, two UEs (e.g., UE1, UE2) in a connected state may receive MBS multicast data.

In various embodiments, due to a lost PTM transmission, legacy new data indicator ("NDI") comparison may lead to erroneous SC at UE2 (e.g., log-likelihood ratios ("LLRs") of TB2 may be combined with LLRs of TB1 (e.g., stored in the soft buffer).

In certain embodiments, the problem occurs because of an NDI setting of the PTM transmission (e.g., unrelated to the PTP transmissions occurring for the same hybrid automatic repeat request ("HARQ") process).

FIG. 5 is a timing diagram illustrating one embodiment of a system 500 having an erroneous soft combining for MBS. The system 500 includes a first transport block ("TB") 502 TB1, a missed second TB 504 (e.g., physical downlink control channel ("PDCCH") missed), and a second TB 506 TB2 (e.g., retransmission of TB2) transmitted to a first UE 508 UE1 and a second UE 510 UE2. In this embodiment, UE1 receives TB1 via PTP 512 having a new data indicator ("NDI")=0, misses TB2 via PTM 514 having an NDI=1, then receives TB2 via PTP 516 having an NDI=1. Because TB2 via PTP 516 has an NDI=1 which is different from the TB1 via PTP 512, UE1 knows that it is receiving new data even though it missed TB2 via PTM 514. In contrast, UE2 receives TB1 via PTP 518 having an NDI=1, misses TB2 via PTM 514 having an NDI=1, then receives TB2 via PTP 520 having an NDI=1. The UE 510 compares 522 the NDI of TB2 via PTP 520 with the NDI of TB1 via PTP 518. Because the NDI of PTP 518 and PTP 520 both equal 1, if TB1 was not correctly decoded, UE2 may erroneously perform soft combining.

As may be appreciated, there are two possibilities for UE2 in FIG. 5: 1) UE2 decoded TB1 correctly (e.g., before missing the PTM 514 transmission of TB2); or 2) UE2 didn't decode TB1 correctly (e.g., before missing the PTM 514 transmission of TB2).

For FIG. 5, if the UE2 decoded TB1 correctly, since NDI for the retransmission of TB2 (e.g., PTP) is the same as the NDI which was signalled for the last transmission of TB1, UE2 basically assumes that this is a further retransmission of TB1 (e.g., even though it is a retransmission of TB2). Thus, UE2 may not perform a soft combining of the two PTP transmissions since the TB1 (e.g., the TB which is currently in UE2's soft buffer) was already correctly decoded. Assuming UE2 has correctly received the transmission of TB1 and reported ACK, UE2 will basically not decode the retransmission of TB2 and only send ACK. So UE2 will miss TB2 (e.g., packet loss).

For FIG. 5, if the UE2 didn't decode TB1 correctly (e.g., before missing the PTM transmission of TB2), UE2 may perform an erroneous soft combining (e.g., there will be loss of TB1 and TB2) if the TB size of TB2 is the same as the TB size of TB1.

In some embodiments, for multicast service, a gNB may deliver MBS data packets using the following methods: 1) PTP transmission: gNB individually delivers separate copies of MBS data packets to each UE independently (e.g., the gNB uses a UE-specific physical downlink control channel ("PDCCH") with a cyclic redundancy check ("CRC") scrambled by a UE-specific radio network temporary identifier ("RNTI") (e.g., cell RNTI ("C-RNTI")) to schedule UE-specific a physical downlink shared channel ("PDSCH") transmission which is scrambled with the same UE-specific RNTI; and 2) PTM transmission: the gNB delivers a single copy of MBS data packets to a set of UEs (e.g., the gNB uses group-common PDCCH with CRC scrambled by group-common RNTI to schedule group-common PDSCH which is scrambled with the same group-common RNTI).

As used herein eNB and/or gNB may be used for a base station, but may be replaceable by any other radio access nodes (e.g., base station ("BS"), access point ("AP"), new radio ("NR") distributed unit ("DU") and/or centralized unit ("CU"), relay, and so forth). Moreover, embodiments described herein may be described in the context of 5G NR, however, the various embodiments may be applicable to other mobile communication systems supporting serving cells and/or carriers configured in a licensed or unlicensed spectrum mobile wireless or cellular telecommunications system.

In a first embodiment, a UE decodes a TB received in downlink (e.g., PDSCH) if an NDI received within corresponding downlink control information ("DCI") and/or PDCCH has not been toggled compared to a value of a previous received transmission for the same HARQ process and the data stored in the HARQ process has already been successfully decoded. In one implementation of the first embodiment, the UE attempts to decode the received data and/or TB and replaces the data in the soft buffer for this HARQ process with the data which a medium access control ("MAC") entity attempted to decode. To avoid a packet loss if an MBS PTM initial transmission is missed by the UE (e.g., the MBS PTM transmission occurring between two MBS PTP transmissions or retransmissions on the same HARQ process), the UE may, if the NDI indicates a retransmission of an already correctly decoded TB, attempt to decode the received data. The UE may perform the same behavior if an MBS PTM transmission occurs between a unicast transmission and an MBS PTP transmission on the same HARQ process. It should be noted that the UE doesn't combine the received data with the data currently stored in the soft buffer and doesn't attempt to decode the combined data because the UE has already correctly decoded the TB and/or data in the soft buffer. Based on the received NDI that indicates a further retransmission of the data, the UE may determine that an error happened in response to receiving a further retransmission of the correctly decoded TB. However, the UE may not be able to distinguish between: 1) an acknowledgement ("ACK") to negative acknowledgement ("NACK") error (e.g., UE sent ACK in response to correctly decoding the TB but the ACK was misinterpreted as NACK by the gNB; or 2) a missed initial transmission (e.g., MBS PTM initial transmission as shown in the FIG. 6 (e.g., initial transmission of TB2 is missed by UE).

Figure 6:
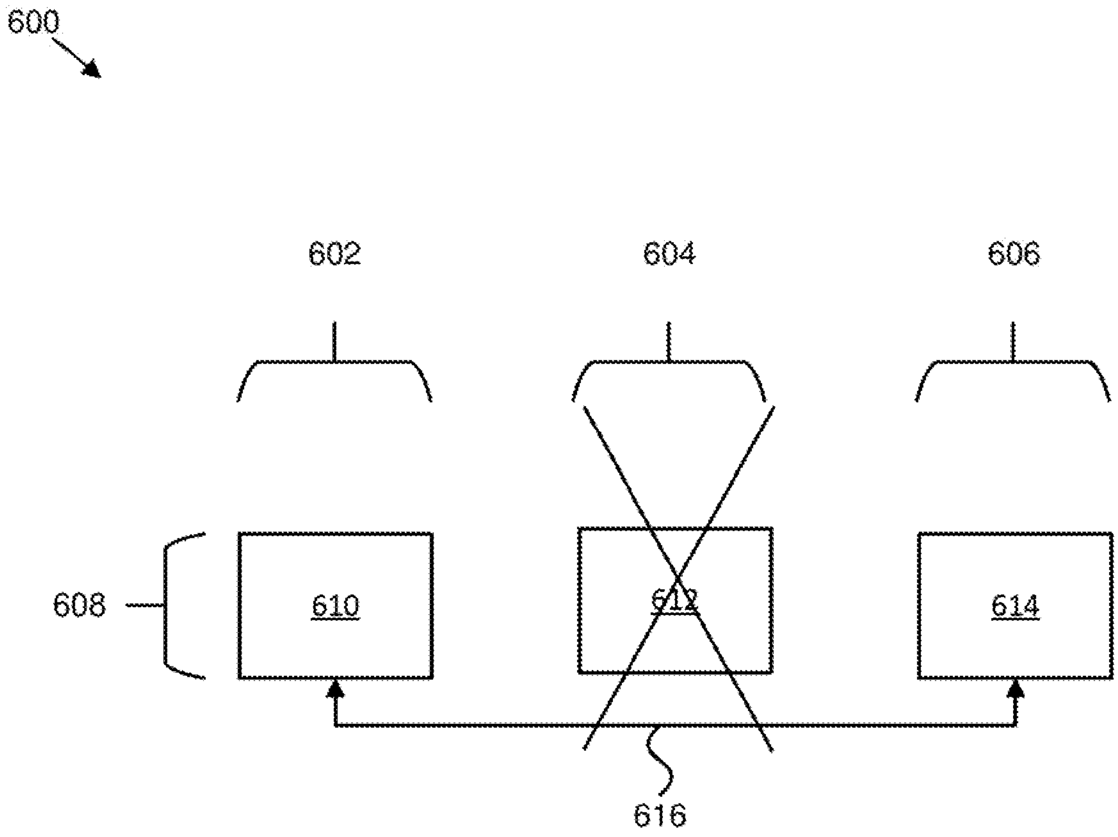
FIG. 6 is a timing diagram illustrating one embodiment of a system having a missed message.

FIG. 6 is a timing diagram illustrating one embodiment of a system 600 having a missed message. The system 600 includes a first TB 602 TB1, a missed second TB 604 (e.g., PDCCH missed), and a second TB 606 TB2 (e.g., retransmission of TB2) transmitted to a UE 608. In this embodiment, the UE 608 receives TB1 via PTP 610 having an NDI=1, misses TB2 via PTM 612 having an NDI=1, then receives TB2 via PTP 614 having an NDI=1. The system 600 compares 616 the NDI of TB2 via PTP 614 with the NDI of TB1 via PTP 610.

In various embodiments, it may be assumed that the transport block size of the data stored in a soft buffer of a HARQ process and the received data (e.g., for which NDI is not toggled) is the same. In one implementation of the first embodiment, the UE considers received data as a new transmission if the data stored in the HARQ process has been successfully decoded before and the NDI has not been toggled compared to the value of the previous received transmission for the same HARQ process. In such embodiments, one assumption may be that an NDI comparison is done among DCI addressed to the same RNTI.

One embodiment of a UE behavior is shown in Table 1.

TABLE 1

| HARQ Process |
|---|
| When a transmission takes place for the HARQ process, one or two (in case of downlink spatial multiplexing) TBs and the associated HARQ information are received from the HARQ entity. |
| For each received TB and associated HARQ information, the HARQ process shall: |
| 1> if the NDI, when provided, has been toggled compared to the value of the previous received transmission corresponding to this TB; or |
| 1> if the HARQ process is equal to the broadcast process, and this is the first received transmission for the TB according to the system information schedule indicated by radio resource control ("RRC"); or |
| 1> if this is the very first received transmission for this TB (i.e. there is no previous NDI for this TB): |
| 2> consider this transmission to be a new transmission. |

TABLE 1-continued

| HARQ Process |
|---|
| 1> else: |
| 2> consider this transmission to be a retransmission. |
| The MAC entity then shall: |
| 1> if this is a new transmission: |
| 2> attempt to decode the received data. |
| 1> else if this is a retransmission: |
| 2> if the data for this TB has not yet been successfully decoded: |
| 3> instruct the physical layer to combine the received data with the data currently in the soft buffer for this TB and attempt to decode the combined data. |
| 2> else |
| 3> attempt to decode the received data. |
| 3> consider this transmission to be a new transmission |
| 1> if the data which the MAC entity attempted to decode was successfully decoded for this TB; or |
| 1> if the data for this TB was successfully decoded before: |
| 2> if the HARQ process is equal to the broadcast process: |
| 3> deliver the decoded MAC PDU to upper layers. |
| 2> else if this is the first successful decoding of the data for this TB: |
| 3> deliver the decoded MAC PDU to the disassembly and demultiplexing entity. |
| 1> else: |
| 2> instruct the physical layer to replace the data in the soft buffer for this TB with the data which the MAC entity attempted to decode. |
| 1> if the HARQ process is associated with a transmission indicated with a Temporary C-RNTI and the Contention Resolution is not yet successful (see clause 5.1.5); or |
| 1> if the HARQ process is associated with a transmission indicated with a MSGB-RNTI and the Random Access procedure is not yet successfully completed (see clause 5.1.4a); or |
| 1> if the HARQ process is equal to the broadcast process; or |
| 1> if the timeAlignmentTimer, associated with the TAG containing the Serving Cell on which the HARQ feedback is to be transmitted, is stopped or expired: |
| 2> not instruct the physical layer to generate acknowledgement(s) of the data in this TB. |
| 1> else: |
| 2> instruct the physical layer to generate acknowledgement(s) of the data in this TB. |
| The MAC entity shall ignore NDI received in all downlink assignments on PDCCH for its Temporary C-RNTI when determining if NDI on PDCCH for its C-RNTI has been toggled compared to the value in the previous transmission. |

NOTE:
If the MAC entity receives a retransmission with a TB size different from the last TB size signalled for this TB, the UE behavior is left up to UE implementation.

In a second embodiment, DCI used for PDSCH transmissions carrying MBS data may include two separate NDI fields used for HARQ soft buffer management in receiving UEs. In one implementation of the second embodiment, a first NDI field (e.g., a one-bit field) is used as an NDI for MBS PTM transmission (e.g., MBS transmissions in the PTM transmission mode). In such an implementation, the second NDI field in the DCI (e.g., a one-bit field) is used as an NDI for MBS PTP transmissions or unicast transmissions (e.g., carrying non-MBS data). It should be noted that the NDI for MBS PTP transmission may be a legacy NDI bit contained in DCI. In another implementation of the second embodiment, a DCI used for PDSCH transmission carrying MBS data includes a two-bit NDI field, wherein the most significant bit ("MSB") of the 2-bit NDI field (e.g., first bit, leftmost bit) is used as an NDI for PTM transmissions and a least significant bit ("LSB") of the two-bit NDI (e.g., second bit, rightmost bit) is used as an NDI for PTP transmissions. In such embodiments, a gNB toggles, for each new (e.g., initial) MBS PTM transmission of an MBS group, the PTM NDI for a HARQ process (e.g., MSB of the two-bit NDI field). A PTM NDI status and/or context may be maintained at the gNB per UE or per MBS group and/or service and per HARQ process.

In a further implementation of the second embodiment, the gNB sets the NDIs (e.g., PTM NDI and PTP NDI) in the DCI as follows: 1) for PTM transmissions: the gNB toggles the PTM NDI (e.g., 1st bit or MSB) for each new (e.g., initial) PTM transmission for the same MBS group and/or service—the PTP NDI (e.g., 2nd bit or LSB) may be set to a random value (e.g., 0 or 1) for an initial PTM transmission ("TX"). In certain embodiments, a PTP NDI (e.g., 2nd bit or LSB) may be kept unchanged (e.g., only the PTM NDI is toggled); and 2) for PTP transmissions: the gNB toggles the PTP NDI (e.g., 2nd bit or LSB) compared to a previous PTP transmission for the same HARQ process for each initial PTP TX—the PTM NDI (e.g., 1st bit or MSB) is kept untoggled (e.g., PTM NDI status is not changed).

In another implementation of the second embodiment, a UE, when receiving a DCI for a PDSCH transmission carrying MBS data, compares the value of the 2-bit NDI field with the NDI value of the previous received MBS transmission for the same HARQ process (e.g., UE considers this as a two-bit NDI value). If the NDI value has not been changed compared to the previous value it indicates a retransmission, whereas a NDI value which has been changed compared to the previous received value indicates a new (e.g., initial) transmission. The NDI value may be a value between 0 and 3 (e.g., 2-bit NDI field). The HARQ buffer management may be similar to a legacy HARQ soft buffer management.

Some illustrations showing usage of a 2-bit NDI field according to the second embodiment are given in FIG. 7. It should be noted that the 1st bit (e.g., MSB) of the 2-bit NDI represents the PTM NDI and the 2nd bit (e.g., LSB) of the 2-bit NDI represents the PTP NDI. It should also be noted that the 2-bit NDI field may be either jointly encoded or be implemented by two independent 1-bit NDI fields (e.g., a 1-bit PTP NDI and a 1-bit PTM NDI field). As may be appreciated, by using a two-bit NDI, where one of the two bits is used as an NDI for PTM and the other bit represents an NDI for PTP transmission, a wrong soft combining by UEs may be avoided if an MBS transmission (e.g., PTM transmission) is missed by UEs. Specifically, FIG. 7 illustrates one embodiment of examples 700 of a two bit NDI. The examples 700 include a first example 702, a second example 704, and a third example 706.

In a further implementation of the second embodiment, a new DCI format is used for MBS transmissions on PDSCH which contains the 2 bit NDI field used for the HARQ buffer management in the UE. In another implementation of the second embodiment, an existing DCI format is used where one of the current fields is reused to signal the NDI information for MBS transmissions. For example, the "transmit power control ("TPC")-command for scheduled physical uplink control channel ("PUCCH")" field in DCI format with CRC scrambled by group RNTI ("G-RNTI") or the "ChannelAccess-CPext" field may be reused to indicate the new NDI information for MBS transmissions. The RNTI used for MBS transmissions (e.g., different RNTIs may be used for PTP and PTM transmissions) may indicate to the receiving UEs that the legacy fields (e.g., "TPC-command for scheduled PUCCH" or "ChannelAccess-CPext") are to be interpreted as the NDI information.

In a third embodiment, a DCI used for PDSCH transmissions carrying MBS data may include an indicator indicating whether an immediately preceding transmission for a HARQ process was an initial PTM transmission. In one implementation of the third embodiment, the new indication is signalled by a one-bit flag within DCI. In another implementation of the third embodiment, the indicator is together with the NDI bit used by the receiving UEs for HARQ soft buffer management. Based on the indication, which is referred to as a P-bit in the following, a receiving UE knows whether there was a previous initial PTM transmission (e.g., whether a new TB has been transmitted previously). The UE takes this information into account together with the NDI for the management of its HARQ soft buffers. In a further implementation of the third embodiment, the P-bit set to '0' indicates that the previous transmission for the HARQ process was not an initial PTM transmission. Moreover, the P-bit set to '1' indicates that the immediately preceding transmission on the HARQ process was an initial PTM transmission. In another implementation of the third embodiment, if the UE receives a DCI for an MBS PDSCH transmission containing a P-bit set to '1' (e.g., indicating that the immediately preceding transmission on the HARQ process was an initial PTM transmission), the NDI in the received DCI is not toggled compared to the previous transmission for the same HARQ process, thus the UE may detect that it had missed the previous initial PTM transmission. In such an embodiment, the UE will not combine the received data with the data stored in the soft buffer—even though the NDI is untoggled—but may attempt to decode the received data. The UE may replace the data in the soft buffer of the HARQ process with the received data. In this embodiment, the UE uses, not only the NDI for determining whether to combine a received data with the data stored in the soft buffer, the NDI and the P-bit signalled within the DCI to determine how to handle the received data.

Some examples of using a P-bit according to the third embodiment are given in the FIGS. 8, 9, and 10. As can be seen in FIGS. 8, 9, and 10, by signaling additional information within the DCI to indicate whether the immediately previous transmission on that HARQ process was a new PTM transmission, a wrong soft combining in the UEs may be avoided if a MBS transmission (e.g., PTM transmission) is missed by a UE. Specifically, FIG. 8 illustrates one embodiment of examples 800 using a P-bit. The examples 800 include a first example 802 and a second example 804. FIG. 9 illustrates another embodiment of examples 900 using a P-bit. The examples 900 include a first example 902 and a second example 904. FIG. 10 illustrates a further embodiment of one example 1000 using a P-bit.

In a fourth embodiment, a DCI used for PDSCH transmissions carrying MBS data may include an indicator indicating whether an initial transmission of a TB is made in a PTM transmission mode. In such an embodiment, the new indication may be signalled by a one-bit flag within the DCI. In one implementation of the fourth embodiment, the indicator is together with the NDI bit used by the receiving UEs for HARQ soft buffer management. Based on the indication (e.g., referred to as I-bit), a receiving UE may be aware of whether a current TB was initially transmitted in the PTM transmission mode. The UE takes this information into account together with the NDI for the management of its HARQ soft buffers. For example, based on the I-bit, the UE may detect error cases where a PTM transmission was missed (e.g., PDCCH was missed by the UE). In another implementation of the fourth embodiment, the I-bit set to '0' indicates that the initial transmission of this TB for the HARQ process was not done by a PTM transmission (e.g., done by PTP transmission). Moreover, the I-bit set to '1' indicates that the initial transmission of the TB on the HARQ process was done by a PTM transmission.

Examples of using the additional I-bit according to the fourth embodiment are given in FIG. 11. It should be noted that, by signaling information within the DCI indicating whether the initial transmission of the TB on that HARQ process was done in the PTM transmission mode, a wrong soft combining in the UEs may be avoided if an MBS transmission (e.g., PTM transmission) is missed by a UE. For instance, UE2 may detect by the I-bit that it missed some initial PTM transmission (e.g., initial transmission of TB2). Specifically, FIG. 11 illustrates one embodiment of an example 1100 using an I-bit.

In a fifth embodiment, a DCI used for PDSCH transmissions carrying MBS data may include an indicator indicating whether an initial transmission of a TB was done in a different transmission mode compared to a current transmission of the same TB. In one implementation of the fifth embodiment, the new indication is signalled by a one-bit flag within the DCI. In another implementation of the fifth embodiment, the indicator is together with the NDI bit used by receiving UEs for HARQ soft buffer management. Based on the indication, which is referred to as S-bit, a receiving UE is aware of whether the current TB was initially transmitted in a different transmission mode (e.g., PTP or PTM mode) compared to a current received PDCCH and/or PDSCH transmission. For instance, the value zero indicates that no transmission mode switch has happened (e.g., initial transmission was done with the same transmission mode as the current received data transmission). The value 'one' indicates that the initial transmission was done in a different transmission mode than the received data (e.g., when current received transmission is a PTP retransmission) and the S-bit is set to '1' means that the initial transmission was done in a PTM mode. In the fifth embodiment, the additional indication in the DCI may indicate whether a transmission mode switch has happened (e.g., PTM-PTP switch). The UE takes this information into account together with the NDI for the management of its HARQ soft buffers. For example, based on the S-bit, the UE may detect error cases where a PTM transmission was missed (e.g., PDCCH was missed by the UE).

In a sixth embodiment, a field in the DCI used for PDSCH transmissions carrying MBS data indicates a current transmission number of a corresponding transport block. The length of the field may be n bits. In one implementation of the sixth embodiment, for initial transmission of a TB, the field indicates the value zero. For the first retransmission, the field indicates the value 'one', for the second retransmission the value '2', and so forth. In one implementation of the sixth embodiment, the indicator is together with the NDI bit used by receiving UEs for HARQ soft buffer management.

In another implementation of the sixth embodiment, a redundancy version ("RV") field is used to indicate to indicate a transmission number. By predefining a RV sequence (e.g., for example 0, 2, 3, 1), the RV index may implicitly indicate a transmission number (e.g., an RV index equal to 2 may implicitly indicate the first retransmission assuming that the RV sequence is 0, 2, 3, 1).

In a seventh embodiment, a DCI used for PDSCH transmission carrying MBS data contains a field indicating a time offset for a last transmission for the same TB. In one implementation of the seventh embodiment, the time offset is represented in a number of slots and/or symbols or milliseconds. In another implementation of the seventh embodiment, the field is set to value 'zero' for an initial transmission of a TB. In one example, for the first retransmission the field may indicate the value '5' (e.g., in terms of slots or milliseconds) if the first retransmission takes place 5 slots and/or milliseconds after the initial transmission. The UE takes this time offset information into account together with the NDI for the management of its HARQ soft buffers. For example, based on the time offset, the UE may detect error cases if a previous MBS transmission was missed (e.g., PDCCH was missed by the UE).

Figure 12:
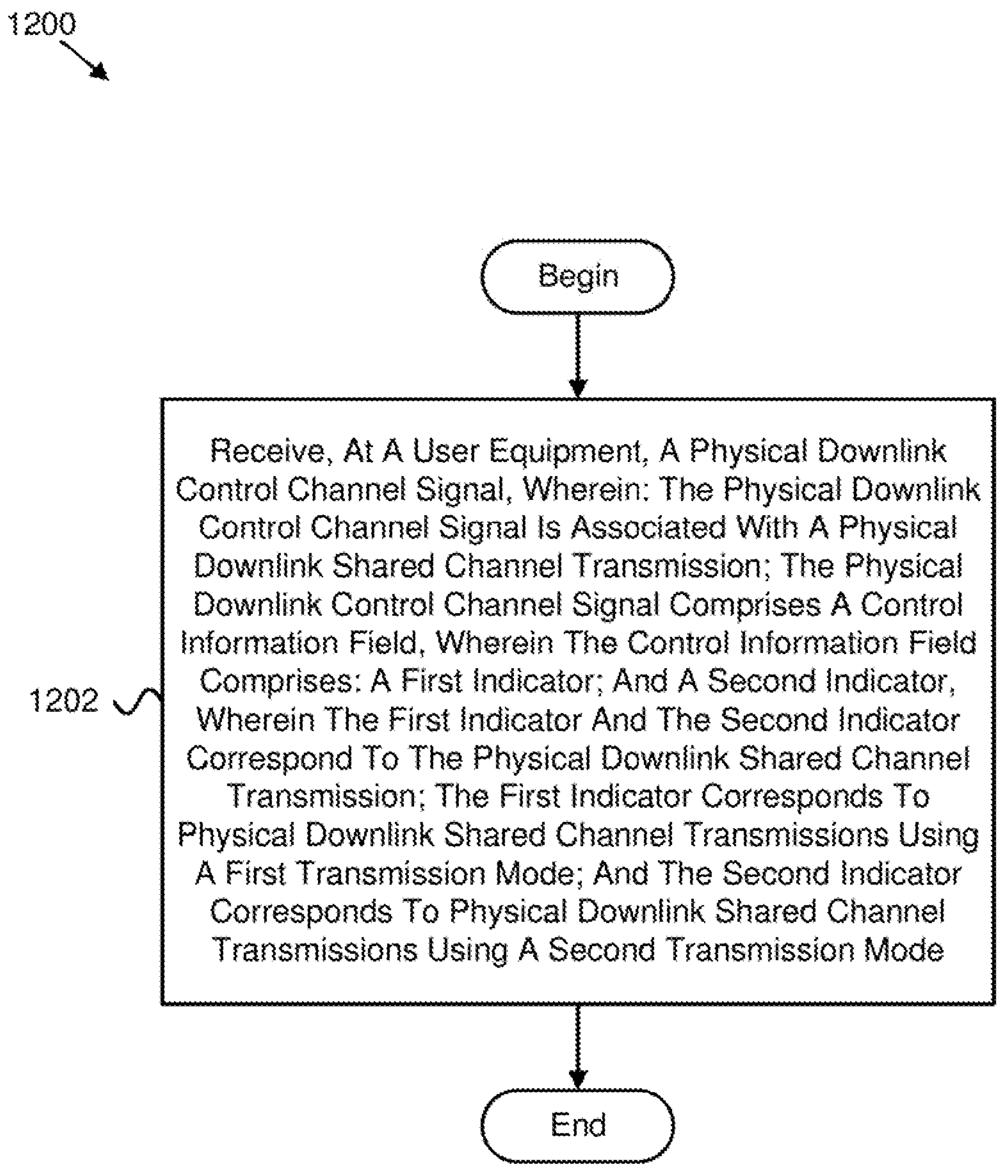
FIG. 12 is a flow chart diagram illustrating one embodiment of a method for indicators for physical downlink shared channel transmissions.

FIG. 12 is a flow chart diagram illustrating one embodiment of a method 1200 for indicators for physical downlink shared channel transmissions. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes receiving 1202, at a user equipment, a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

In certain embodiments, the first transmission mode corresponds to point-to-multipoint physical downlink shared channel transmissions and the second transmission mode corresponds to point-to-point physical downlink shared channel transmission. In some embodiments, the first indicator comprises a first new data indicator and the second indicator comprises a second new data indicator. In various embodiments, the first indicator indicates whether a current transmission in the first transmission mode is an initial transmission of a transport block in the first transmission mode or a retransmission of the transport block in the first transmission mode.

In one embodiment, the method 1200 further comprises performing soft combining of data received with data in a soft buffer in response to the control information field matching a last control information field. In certain embodiments, the method 1200 further comprises not performing soft combining of data received with data in a soft buffer in response to the control information field not matching a last control information field. In some embodiments, the method 1200 further comprises replacing the data in the soft buffer with the data received and attempting to decode the data received.

In various embodiments, the first indicator comprises an immediately preceding transmission mode indicator and the second indicator comprises a new data indicator. In one embodiment, the first indicator indicates whether an immediately preceding transmission is an initial transmission of a transport block in the first transmission mode. In certain embodiments, the first indicator indicates that the immediately preceding transmission is an initial transmission of the transport block in the first transmission mode in response to the first indicator having a first predetermined value.

In some embodiments, the first indicator indicates that the immediately preceding transmission is not an initial transmission of the transport block in the first transmission mode in response to the first indicator having a second predetermined value.

Figure 13:
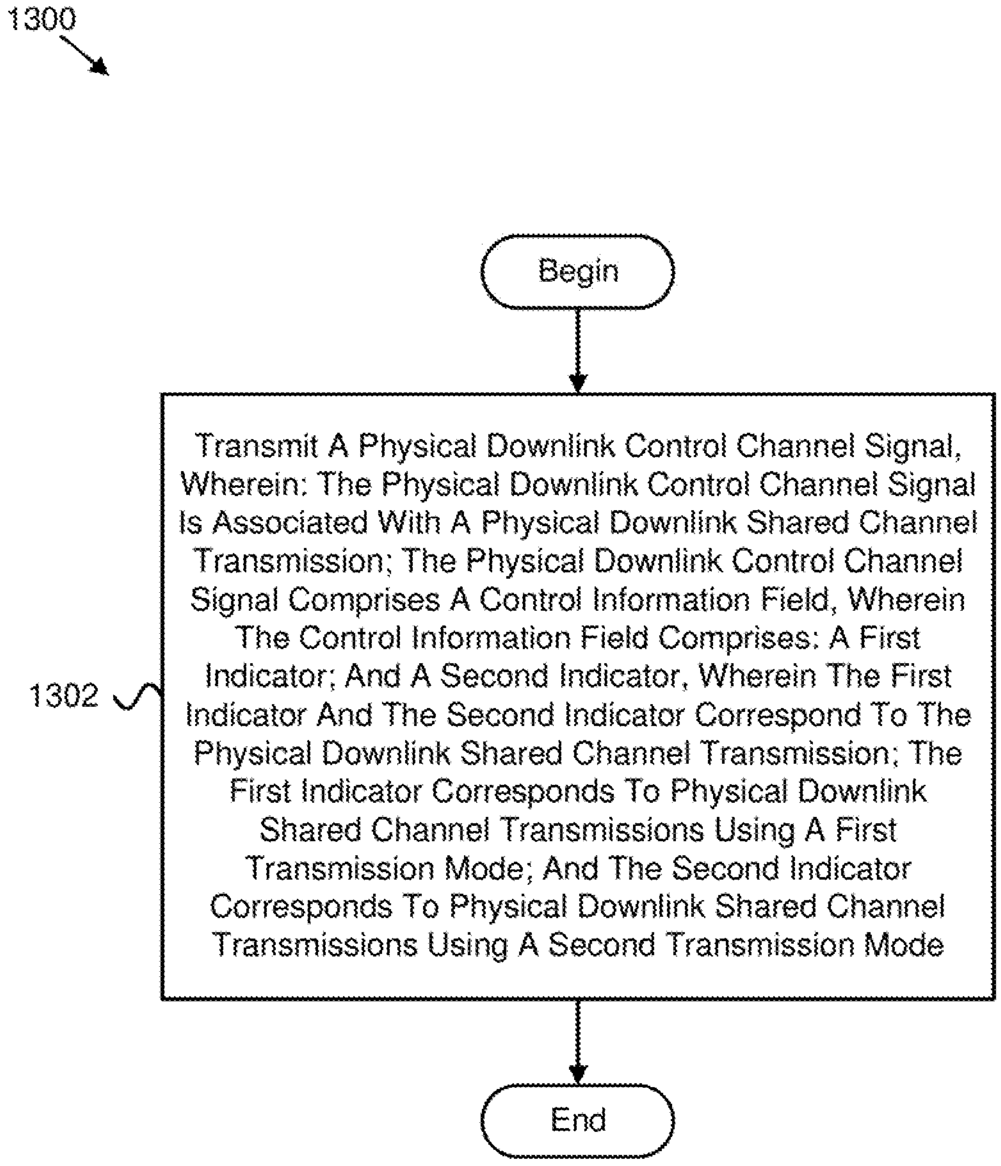
FIG. 13 is a flow chart diagram illustrating another embodiment of a method for indicators for physical downlink shared channel transmissions.

FIG. 13 is a flow chart diagram illustrating one embodiment of a method 1300 for indicators for physical downlink shared channel transmissions. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes transmitting 1302 a physical downlink control channel signal. The physical downlink control channel signal is associated with a physical downlink shared channel transmission, and the physical downlink control channel signal includes a control information field. The control information field includes a first indicator and a second indicator. The first indicator and the second indicator correspond to the physical downlink shared channel transmission, the first indicator corresponds to physical downlink shared channel transmissions using a first transmission mode, and the second indicator corresponds to physical downlink shared channel transmissions using a second transmission mode.

In certain embodiments, the first transmission mode corresponds to point-to-multipoint physical downlink shared channel transmissions and the second transmission mode corresponds to point-to-point physical downlink shared channel transmission. In some embodiments, the first indicator comprises a first new data indicator and the second indicator comprises a second new data indicator. In various embodiments, the first indicator indicates whether a current transmission in the first transmission mode is an initial transmission of a transport block in the first transmission mode or a retransmission of the transport block in the first transmission mode.

In one embodiment, the first indicator indicates that the current transmission in the first transmission mode is an initial transmission of the transport block in the first transmission mode in response to the first indicator not matching a last first indicator transmitted in the first transmission mode. In certain embodiments, the second indicator indicates whether a current transmission is an initial transmission of a transport block in the second transmission mode or a retransmission of the transport block in the second transmission mode. In some embodiments, the second indicator indicates that the current transmission is an initial transmission of the transport block in the second transmission mode in response to the second indicator not matching a last second indicator transmitted in a prior transmission in either the first transmission mode or the second transmission mode.

In various embodiments, the first indicator comprises an immediately preceding transmission mode indicator and the second indicator comprises a new data indicator. In one embodiment, the first indicator indicates whether an immediately preceding transmission is an initial transmission of a transport block in the first transmission mode. In certain embodiments, the first indicator indicates that the immediately preceding transmission is an initial transmission of the transport block in the first transmission mode in response to the first indicator having a first predetermined value.

In some embodiments, the first indicator indicates that the immediately preceding transmission is not an initial transmission of the transport block in the first transmission mode in response to the first indicator having a second predetermined value.

In one embodiment, a method comprises: receiving, at a user equipment, a physical downlink control channel signal, wherein: the physical downlink control channel signal is associated with a physical downlink shared channel transmission; the physical downlink control channel signal comprises a control information field, wherein the control information field comprises: a first indicator; and a second indicator, wherein the first indicator and the second indicator correspond to the physical downlink shared channel transmission; the first indicator corresponds to physical downlink shared channel transmissions using a first transmission mode; and the second indicator corresponds to physical downlink shared channel transmissions using a second transmission mode.

In certain embodiments, the first transmission mode corresponds to point-to-multipoint physical downlink shared channel transmissions and the second transmission mode corresponds to point-to-point physical downlink shared channel transmission.

In some embodiments, the first indicator comprises a first new data indicator and the second indicator comprises a second new data indicator.

In various embodiments, the first indicator indicates whether a current transmission in the first transmission mode is an initial transmission of a transport block in the first transmission mode or a retransmission of the transport block in the first transmission mode.

In one embodiment, the method further comprises performing soft combining of data received with data in a soft buffer in response to the control information field matching a last control information field.

In certain embodiments, the method further comprises not performing soft combining of data received with data in a soft buffer in response to the control information field not matching a last control information field.

In some embodiments, the method further comprises replacing the data in the soft buffer with the data received and attempting to decode the data received.

In various embodiments, the first indicator comprises an immediately preceding transmission mode indicator and the second indicator comprises a new data indicator.

In one embodiment, the first indicator indicates whether an immediately preceding transmission is an initial transmission of a transport block in the first transmission mode.

In certain embodiments, the first indicator indicates that the immediately preceding transmission is an initial transmission of the transport block in the first transmission mode in response to the first indicator having a first predetermined value.

In some embodiments, the first indicator indicates that the immediately preceding transmission is not an initial transmission of the transport block in the first transmission mode in response to the first indicator having a second predetermined value.

In one embodiment, an apparatus comprises a user equipment. The apparatus further comprises: a receiver that receives a physical downlink control channel signal, wherein: the physical downlink control channel signal is associated with a physical downlink shared channel transmission; the physical downlink control channel signal comprises a control information field, wherein the control information field comprises: a first indicator; and a second indicator, wherein the first indicator and the second indicator correspond to the physical downlink shared channel transmission; the first indicator corresponds to physical downlink shared channel transmissions using a first transmission mode; and the second indicator corresponds to physical downlink shared channel transmissions using a second transmission mode.

In certain embodiments, the first transmission mode corresponds to point-to-multipoint physical downlink shared channel transmissions and the second transmission mode corresponds to point-to-point physical downlink shared channel transmission.

In some embodiments, the first indicator comprises a first new data indicator and the second indicator comprises a second new data indicator.

In various embodiments, the first indicator indicates whether a current transmission in the first transmission mode is an initial transmission of a transport block in the first transmission mode or a retransmission of the transport block in the first transmission mode.

In one embodiment, the apparatus further comprises a processor that performs soft combining of data received with data in a soft buffer in response to the control information field matching a last control information field.

In certain embodiments, the apparatus further comprises a processor that does not perform soft combining of data received with data in a soft buffer in response to the control information field not matching a last control information field.

In some embodiments, the processor replaces the data in the soft buffer with the data received and attempts to decode the data received.

In various embodiments, the first indicator comprises an immediately preceding transmission mode indicator and the second indicator comprises a new data indicator.

In one embodiment, the first indicator indicates whether an immediately preceding transmission is an initial transmission of a transport block in the first transmission mode.

In certain embodiments, the first indicator indicates that the immediately preceding transmission is an initial transmission of the transport block in the first transmission mode in response to the first indicator having a first predetermined value.

In some embodiments, the first indicator indicates that the immediately preceding transmission is not an initial transmission of the transport block in the first transmission mode in response to the first indicator having a second predetermined value.

In one embodiment, a method comprises: transmitting a physical downlink control channel signal, wherein: the physical downlink control channel signal is associated with a physical downlink shared channel transmission; the physical downlink control channel signal comprises a control information field, wherein the control information field comprises: a first indicator; and a second indicator, wherein the first indicator and the second indicator correspond to the physical downlink shared channel transmission; the first indicator corresponds to physical downlink shared channel transmissions using a first transmission mode; and the second indicator corresponds to physical downlink shared channel transmissions using a second transmission mode.

In certain embodiments, the first transmission mode corresponds to point-to-multipoint physical downlink shared channel transmissions and the second transmission mode corresponds to point-to-point physical downlink shared channel transmission.

In some embodiments, the first indicator comprises a first new data indicator and the second indicator comprises a second new data indicator.

In various embodiments, the first indicator indicates whether a current transmission in the first transmission mode is an initial transmission of a transport block in the first transmission mode or a retransmission of the transport block in the first transmission mode.

In one embodiment, the first indicator indicates that the current transmission in the first transmission mode is an initial transmission of the transport block in the first transmission mode in response to the first indicator not matching a last first indicator transmitted in the first transmission mode.

In certain embodiments, the second indicator indicates whether a current transmission is an initial transmission of a transport block in the second transmission mode or a retransmission of the transport block in the second transmission mode.

In some embodiments, the second indicator indicates that the current transmission is an initial transmission of the transport block in the second transmission mode in response to the second indicator not matching a last second indicator transmitted in a prior transmission in either the first transmission mode or the second transmission mode.

In various embodiments, the first indicator comprises an immediately preceding transmission mode indicator and the second indicator comprises a new data indicator.

In one embodiment, the first indicator indicates whether an immediately preceding transmission is an initial transmission of a transport block in the first transmission mode.

In certain embodiments, the first indicator indicates that the immediately preceding transmission is an initial transmission of the transport block in the first transmission mode in response to the first indicator having a first predetermined value.

In some embodiments, the first indicator indicates that the immediately preceding transmission is not an initial transmission of the transport block in the first transmission mode in response to the first indicator having a second predetermined value.

In one embodiment, an apparatus comprises: a transmitter that transmits a physical downlink control channel signal, wherein: the physical downlink control channel signal is associated with a physical downlink shared channel transmission; the physical downlink control channel signal comprises a control information field, wherein the control information field comprises: a first indicator; and a second indicator, wherein the first indicator and the second indicator correspond to the physical downlink shared channel transmission; the first indicator corresponds to physical downlink shared channel transmissions using a first transmission mode; and the second indicator corresponds to physical downlink shared channel transmissions using a second transmission mode.

In certain embodiments, the first transmission mode corresponds to point-to-multipoint physical downlink shared channel transmissions and the second transmission mode corresponds to point-to-point physical downlink shared channel transmission.

In some embodiments, the first indicator comprises a first new data indicator and the second indicator comprises a second new data indicator.

In various embodiments, the first indicator indicates whether a current transmission in the first transmission mode is an initial transmission of a transport block in the first transmission mode or a retransmission of the transport block in the first transmission mode.

In one embodiment, the first indicator indicates that the current transmission in the first transmission mode is an initial transmission of the transport block in the first transmission mode in response to the first indicator not matching a last first indicator transmitted in the first transmission mode.

In certain embodiments, the second indicator indicates whether a current transmission is an initial transmission of a transport block in the second transmission mode or a retransmission of the transport block in the second transmission mode.

In some embodiments, the second indicator indicates that the current transmission is an initial transmission of the transport block in the second transmission mode in response to the second indicator not matching a last second indicator transmitted in a prior transmission in either the first transmission mode or the second transmission mode.

In various embodiments, the first indicator comprises an immediately preceding transmission mode indicator and the second indicator comprises a new data indicator.

In one embodiment, the first indicator indicates whether an immediately preceding transmission is an initial transmission of a transport block in the first transmission mode.

In certain embodiments, the first indicator indicates that the immediately preceding transmission is an initial transmission of the transport block in the first transmission mode in response to the first indicator having a first predetermined value.

In some embodiments, the first indicator indicates that the immediately preceding transmission is not an initial transmission of the transport block in the first transmission mode in response to the first indicator having a second predetermined value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving a physical downlink control channel (PDCCH) signal, wherein:

the PDCCH signal schedules a physical downlink shared channel (PDSCH) transmission for a hybrid automatic repeat request (HARQ) process;

the PDCCH signal comprises a control information field that schedules the PDSCH transmission, wherein the control information field comprises:

a first indicator; and a second indicator, wherein the first indicator and the second indicator are both contained in the control information field and both correspond to the PDSCH transmission scheduled by the control information field;

the first indicator corresponds to PDSCH transmissions of the HARQ process using a first transmission mode; and the second indicator corresponds to PDSCH transmissions of the HARQ process using a second transmission mode different from the first transmission mode; and decoding the control information field to obtain the first indicator and the second indicator.

2. The method of claim 1, wherein the first transmission mode corresponds to point-to-multipoint PDSCH transmissions and the second transmission mode corresponds to point-to-point PDSCH transmission.

3. The method of claim 1, wherein the first indicator comprises a first new data indicator (NDI) and the second indicator comprises a second NDI.

4. The method of claim 1, further comprising performing soft combining of data received with data in a soft buffer in response to the control information field matching a last control information field.

5. The method of claim 1, wherein the first indicator comprises an immediately preceding transmission mode indicator and the second indicator comprises a new data indicator (NDI).

6. The method of claim 1, wherein the first indicator indicates whether an immediately preceding transmission is an initial transmission of a transport block in the first transmission mode.

7. A user equipment (UE), comprising:

at least one memory; and at least one processor coupled with the at least one memory and configured to cause the UE to:

receive a physical downlink control channel (PDCCH) signal, wherein:

the PDCCH signal schedules a physical downlink shared channel (PDSCH) transmission for a hybrid automatic repeat request (HARQ) process;

the PDCCH signal comprises a control information field that schedules the PDSCH transmission, wherein the control information field comprises:

a first indicator; and a second indicator, wherein the first indicator and the second indicator are both contained in the control information field and both correspond to the PDSCH transmission scheduled by the control information field;

the first indicator corresponds to PDSCH transmissions of the HARQ process using a first transmission mode; and the second indicator corresponds to PDSCH transmissions of the HARQ process using a second transmission mode different from the first transmission mode; and decode the control information field to obtain the first indicator and the second indicator.

8. The UE of claim 7, wherein the first indicator comprises a first new data indicator (NDI) and the second indicator comprises a second NDI.

9. The UE of claim 7, wherein the first indicator indicates whether a current transmission in the first transmission mode is an initial transmission of a transport block in the first transmission mode or a retransmission of the transport block in the first transmission mode.

10. The UE of claim 7, wherein the first indicator comprises an immediately preceding transmission mode indicator and the second indicator comprises a new data indicator (NDI).

11. The UE of claim 7, wherein the first indicator indicates whether an immediately preceding transmission is an initial transmission of a transport block in the first transmission mode.

12. A base station, comprising:

at least one memory; and at least one processor coupled with the at least one memory and configured to cause the base station to:

encode a first indicator and a second indicator into a control information field; and transmit a physical downlink control channel (PDCCH) signal comprising the control information field, wherein:

the PDCCH signal schedules a physical downlink shared channel (PDSCH) transmission for a hybrid automatic repeat request (HARQ) process;

the control information field schedules the PDSCH transmission;

a first indicator; and the first indicator and the second indicator both correspond to the PDSCH transmission scheduled by the control information field;

the first indicator corresponds to PDSCH transmissions of the HARQ process using a first transmission mode; and the second indicator corresponds to PDSCH transmissions of the HARQ process using a second transmission mode different from the first transmission mode.

13. The base station of claim 12, wherein the first indicator comprises a first new data indicator (NDI) and the second indicator comprises a second NDI.

14. The base station of claim 12, wherein the first indicator comprises an immediately preceding transmission mode indicator and the second indicator comprises a new data indicator (NDI).

15. The base station of claim 12, wherein the first indicator indicates whether an immediately preceding transmission is an initial transmission of a transport block in the first transmission mode.

16. A method performed by a base station, comprising:

encoding a first indicator and a second indicator into a control information field; and transmitting a physical downlink control channel (PDCCH) signal comprising the control information field, wherein:

the PDCCH signal schedules a physical downlink shared channel (PDSCH) transmission for a hybrid automatic repeat request (HARQ) process;

the control information field schedules the PDSCH transmission;

the first indicator and the second indicator both correspond to the PDSCH transmission scheduled by the control information field;

the first indicator corresponds to PDSCH transmissions of the HARQ process using a first transmission mode; and the second indicator corresponds to PDSCH transmissions of the HARQ process using a second transmission mode different from the first transmission mode.

17. The method of claim 16, wherein the first indicator comprises a first new data indicator (NDI) and the second indicator comprises a second NDI.

18. The method of claim 16, wherein the first indicator comprises an immediately preceding transmission mode indicator and the second indicator comprises a new data indicator (NDI).

19. The method of claim 16, wherein the first indicator indicates whether an immediately preceding transmission is an initial transmission of a transport block in the first transmission mode.

20. The UE of claim 7, wherein the first transmission mode corresponds to point-to-multipoint PDSCH transmissions and the second transmission mode corresponds to point-to-point PDSCH transmission.

* * * * *